United States Patent

Kaneko et al.

[15] 3,676,600

[45] July 11, 1972

[54] NONLINEAR ENCODER

[72] Inventors: Haruo Kaneko; Kaoru Yano, both of Tokyo, Japan

[73] Assignee: Nippon Electric Company, Limited, Tokyo, Japan

[22] Filed: June 22, 1970

[21] Appl. No.: 48,425

[30] Foreign Application Priority Data

Nov. 10, 1969 Japan ..................................44/90326

[52] U.S. Cl. ................................ 179/15.55 T, 340/347 AD

[51] Int. Cl. ..........................................................H04j 3/00

[58] Field of Search ................179/15.55 R, 15.55 T, 15 AV, 179/15 AC; 340/347

[56] References Cited

UNITED STATES PATENTS

| | | | |
|---|---|---|---|
| 3,180,939 | 4/1965 | Hall | 179/15 |
| 3,151,296 | 9/1964 | Phyfe | 179/15.55 R |
| 3,500,441 | 3/1970 | Brolin | 179/15 |

*Primary Examiner*—Kathleen H. Claffy
*Assistant Examiner*—Jon Bradford Leaheey
*Attorney*—Marn & Jangarathis

[57] ABSTRACT

A multi-bit nonlinear apparatus for encoding an amplitude modulation pulse analog signal of positive and negative polarities into a series of bits in a pulse code modulation system, including two non-linear direct current amplifier stages for translating the input analog signal into first and second serial bits, and a mutli-stage feedback logic encoder for providing subsequent serial bits.

11 Claims, 22 Drawing Figures

INVENTORS
Haruo Kaneko
Kaoru Yano
BY
Marn & Jangarathis
ATTORNEYS

INVENTORS
Haruo Kaneko
Kaoru Yano
BY
Marn & Jangarathis
ATTORNEYS

Fig. 4.

| Coder Input | Comp. Output 1 2 3 4 |
|---|---|
| 1 | |
| | 1 1 1 1 |
| $\frac{22}{30}$ | |
| | 1 1 1 0 |
| $\frac{14}{30}$ | |
| | 1 1 0 1 |
| $\frac{10}{30}$ | |
| | 1 1 0 0 |
| $\frac{6}{30}$ | |
| | 1 0 1 1 |
| $\frac{4}{30}$ | |
| | 1 0 1 0 |
| $\frac{2}{30}$ | |
| | 1 0 0 1 |
| $\frac{1}{30}$ | |
| | 1 0 0 0 |
| 0 | |
| | 0 1 1 1 |
| $-\frac{1}{30}$ | |
| | 0 1 1 0 |
| $-\frac{2}{30}$ | |
| | 0 1 0 1 |
| $-\frac{4}{30}$ | |
| | 0 1 0 0 |
| $-\frac{6}{30}$ | |
| | 0 0 1 1 |
| $-\frac{10}{30}$ | |
| | 0 0 1 0 |
| $-\frac{14}{30}$ | |
| | 0 0 0 1 |
| $-\frac{22}{30}$ | |
| | 0 0 0 0 |
| $-1$ | |

Fig. 5.

| Matrix Input | Matrix Output | Ld. Output |
|---|---|---|
| 1 2 3 4 | I II III IV V VI | |
| 1 1 1 1 | 1 1 0 1 1 0 | $-\frac{22}{30}$ |
| 1 1 1 0 | 1 0 1 1 1 0 | $-\frac{14}{30}$ |
| 1 1 0 1 | 1 0 1 0 1 0 | $-\frac{10}{30}$ |
| 1 1 0 0 | 1 0 0 1 1 0 | $-\frac{6}{30}$ |
| 1 0 1 1 | 1 0 0 1 0 0 | $-\frac{4}{30}$ |
| 1 0 1 0 | 1 0 0 0 1 0 | $-\frac{2}{30}$ |
| 1 0 0 1 | 1 0 0 0 0 1 | $-\frac{1}{30}$ |
| 1 0 0 0 | 1 0 0 0 0 0 | 0 |
| 0 1 1 1 | 0 1 1 1 1 1 | $+\frac{1}{30}$ |
| 0 1 1 0 | 0 1 1 1 1 0 | $+\frac{2}{30}$ |
| 0 1 0 1 | 0 1 1 1 0 0 | $+\frac{4}{30}$ |
| 0 1 0 0 | 0 1 1 0 1 0 | $+\frac{6}{30}$ |
| 0 0 1 1 | 0 1 0 1 1 0 | $+\frac{10}{30}$ |
| 0 0 1 0 | 0 1 0 0 1 0 | $+\frac{14}{30}$ |
| 0 0 0 1 | 0 0 1 0 1 0 | $+\frac{22}{30}$ |

Fig. 6.

| Input Signal | Segment Number | Quantizing Step |
|---|---|---|
| $+1$ | | |
| | XIII | $\frac{1}{16}$ |
| $+\frac{1}{2}$ | | |
| | XII | $\frac{1}{32}$ |
| $+\frac{1}{4}$ | | |
| | XI | $\frac{1}{64}$ |
| $+\frac{1}{8}$ | | |
| | X | $\frac{1}{128}$ |
| $+\frac{1}{16}$ | | |
| | IX | $\frac{1}{256}$ |
| $+\frac{1}{32}$ | | |
| | VIII | $\frac{1}{512}$ |
| $+\frac{1}{64}$ | | |
| | VII | $\frac{1}{1024}$ |
| $-\frac{1}{64}$ | | |
| | VI | $\frac{1}{512}$ |
| $-\frac{1}{32}$ | | |
| | V | $\frac{1}{256}$ |
| $-\frac{1}{16}$ | | |
| | IV | $\frac{1}{128}$ |
| $-\frac{1}{8}$ | | |
| | III | $\frac{1}{64}$ |
| $-\frac{1}{4}$ | | |
| | II | $\frac{1}{32}$ |
| $-\frac{1}{2}$ | | |
| | I | $\frac{1}{16}$ |
| $-1$ | | |

Note:
Input Signal is normalized to ±1, and quantizing Steps are also normalized.

INVENTORS
Haruo Kaneko
Kaoru Yano
BY
Marn & Jangarathis
ATTORNEYS

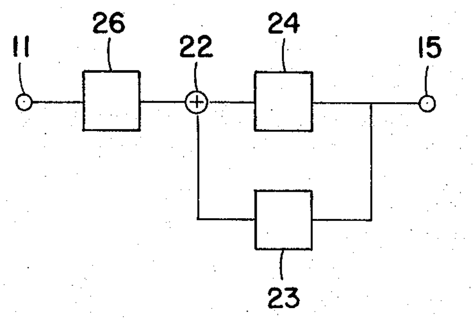
Fig. 7.
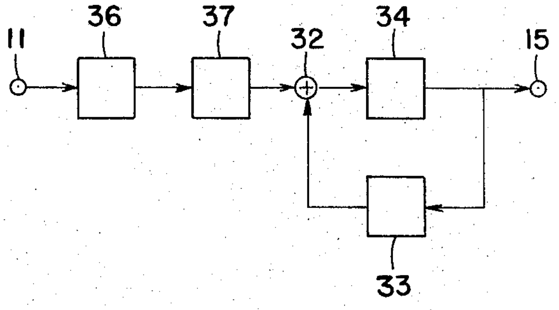
Fig. 11.
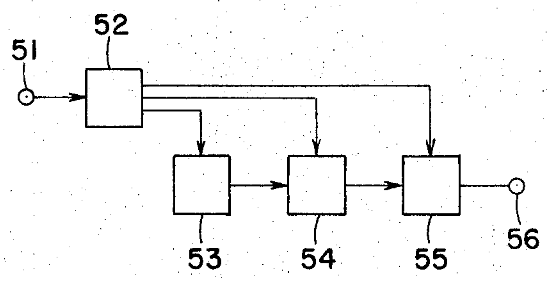
Fig. 19.
| Matrix Input | Matrix Output | Ld. Output |
|---|---|---|
| 1 2 3 | I II III IV V | |
| 1 1 1 | 1 0 1 1 0 | $-\frac{22}{30}$ |
| 1 1 0 | 0 1 1 1 0 | $-\frac{14}{30}$ |
| 1 0 1 | 0 1 0 1 0 | $-\frac{10}{30}$ |
| 1 0 0 | 0 0 1 1 0 | $-\frac{6}{30}$ |
| 0 1 1 | 0 0 1 0 0 | $-\frac{4}{30}$ |
| 0 1 0 | 0 0 0 1 0 | $-\frac{2}{30}$ |
| 0 0 1 | 0 0 0 0 1 | $-\frac{1}{30}$ |
Fig. 10.
INVENTORS
Haruo Kaneko
Kaoru Yano
BY
Marn & Jangarathis
ATTORNEYS INVENTORS
Haruo Kaneko
Kaoru Yano

BY

Marn & Jangarathis

ATTORNEYS

INVENTORS
Haruo Kaneko
Kaoru Yano
BY
Marn & Jangarathis
ATTORNEYS

Fig. 12a.
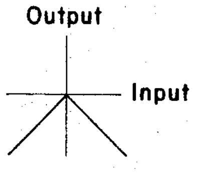
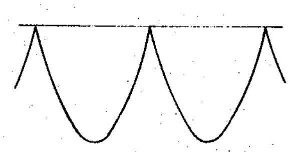
Fig. 12b.
Fig. 12c.
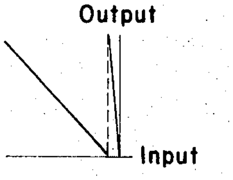
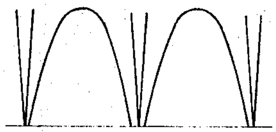
Fig. 12d.
Fig. 16.
| Matrix Input | Matrix Output | Local Dec. Output |
|---|---|---|
| 1 2 | I II III | |
| 0 1 | 0 0 1 | $-\frac{1}{30}$ |
| 1 0 | 0 1 0 | $-\frac{2}{30}$ |
| 1 1 | 1 0 0 | $-\frac{4}{30}$ |
Fig. 18.
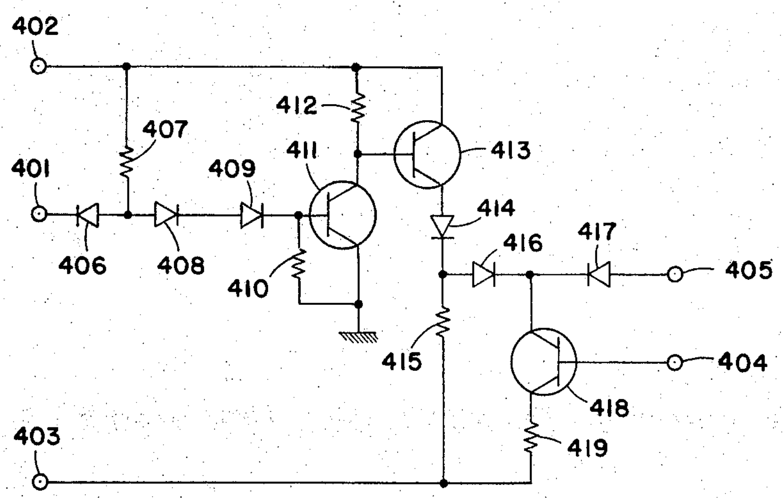
INVENTORS
Haruo Kaneko
Kaoru Yano
BY Marn & Jangarathis
ATTORNEYS INVENTORS
Haruo Kaneko
Kaoru Yano
BY
Mann & Jangarathis
ATTORNEYS INVENTORS
Haruo Kaneko
Kaoru Yano
BY
Marn & Jangarathis
ATTORNEYS

Fig. 15.

| PCM Output | Coder Input | First out Output | Second Bit Input | Second Bit Output | Sum. Amp. Input |
|---|---|---|---|---|---|
| | 1 | − 1 | − 24/30 | 6/30 | 6/30 |
| 1000 | | | | | |
| | 22/30 | − 22/30 | − 16/30 | 4/30 | 4/30 |
| 1001 | | | | | |
| | 14/30 | − 14/30 | − 8/30 | 2/30 | 2/30 |
| 1010 | | | | | |
| | 10/30 | − 10/30 | − 4/30 | 1/30 | 1/30 |
| 1011 | | | | | |
| | 6/30 | − 6/30 | 0 | 0 | 0 6/30 |
| 1100 | | | | | |
| | 4/30 | − 4/30 | 2/30 | − 2/30 | 4/30 |
| 1101 | | | | | |
| | 2/30 | − 2/30 | 4/30 | − 4/30 | 2/30 |
| 1110 | | | | | |
| | 1/30 | − 1/30 | 5/30 | − 5/30 | 1/30 |
| 1111 | | | | | |
| | 0 | 0 | 6/30 | − 6/30 | 0 |
| 0111 | | | | | |
| | − 1/30 | − 1/30 | 5/30 | − 5/30 | 1/30 |
| 0110 | | | | | |
| | − 2/30 | − 2/30 | 4/30 | − 4/30 | 2/30 |
| 0101 | | | | | |
| | − 4/30 | − 4/30 | 2/30 | − 2/30 | 4/30 |
| 0100 | | | | | |
| | − 6/30 | − 6/30 | − 0 | 0 | 6/30 0 |
| 0011 | | | | | |
| | − 10/30 | − 10/30 | − 4/30 | 1/30 | 1/30 |
| 0010 | | | | | |
| | − 14/30 | − 14/30 | − 8/30 | 2/30 | 2/30 |
| 0001 | | | | | |
| | − 22/30 | − 22/30 | − 16/30 | 4/30 | 4/30 |
| 0000 | | | | | |
| | − 1 | − 1 | − 24/30 | 6/30 | 6/30 |

Fig. 17.

| Input Signal | Segment Number | Quantizing Step |
|---|---|---|
| + 1 | | |
| | XV | 256/4079 |
| + 2031/4079 | | |
| | XIV | 128/4079 |
| + 1007/4079 | | |
| | XIII | 64/4079 |
| + 495/4079 | | |
| | XII | 32/4079 |
| + 239/4079 | | |
| | XI | 16/4079 |
| + 111/4079 | | |
| | X | 8/4079 |
| + 47/4079 | | |
| | IX | 4/4079 |
| + 15/4079 | | |
| | VIII | 2/4079 |
| − 15/4079 | | |
| | VII | 4/4079 |
| − 47/4079 | | |
| | VI | 8/4079 |
| − 111/4079 | | |
| | V | 16/4079 |
| − 239/4079 | | |
| | IV | 32/4079 |
| − 495/4079 | | |
| | III | 64/4079 |
| − 1007/4079 | | |
| | II | 128/4079 |
| − 2031/4079 | | |
| | I | 256/4079 |
| − 1 | | |

Note:
Input Signal is normalized to ±1, and quantizing Steps are normalized.

INVENTORS
Haruo Kaneko
Kaoru Yano
BY
Marn & Jangarathis
ATTORNEYS

NONLINEAR ENCODER

DETAILED DESCRIPTION OF INVENTION

This invention relates to a nonlinear encoder used in the time-division multiplex pcm telephone signal transmission system or the like.

In the telephone signal transmission based on the pulse code modulation (hereinafter abbreviated to PCM), the power level of the input voice signal is ranged widely. A linear encoding system, however, can not possess a sufficient dynamic range for this input signal. Therefore, a nonlinear encoding system is generally employed for encoding the voice signal. One of the conventional nonlinear encoding systems for the voice signal is a combination of a diode compander, linear encoder and decoder. Recently, however, another nonlinear encoding system based on digital companding has been employed rather than said conventional nonlinear encoder which tends to cause mismatching. The principal processes of the digital companding nonlinear encoder are to convert the input signal to a PCM signal with several bits more than that of a PCM signal to be transmitted over a PCM transmission line, to compress the number of bits of the converted PCM signal by logical process, to transmit the compressed PCM signal over the PCM transmission line, and, on the receiving side, to expand a number of bits of the transmitted PCM signal by the reverse logical process. Thus, the transmitted signal is decoded into an analog voice signal. More specifically, in order to make this encoding system adaptable to the input voice signal over a wide range of level (dynamic range), the signal-to-quantization noise ratio must be always within the dynamic range. To this effect, it is necessary to keep constant the number of bits for encoding either at a high level or at a low level of the input signal and to use several additional bits for designating the level range. This is the principle of the nonlinear encoding system based on straight line segment approximation, whereby the quantizing step is increased when the input signal level is high, or decreased when the input signal level is low, and thus the signal-to-quantizing noise ratio can be kept constant.

BRIEF DESCRIPTION OF THE DRAWING

FIG. 4 is a table showing an input/output characteristic of FIG. 3;

FIG. 5 is a table illustrating a characteristic of a component in FIG. 2;

FIG. 6 is a table delineating an example of a nonlinear companding characteristic;

FIG. 7 is a block diagram of a second conventional nonlinear encoder;

FIG. 10 is a table showing the operation of FIG. 8;

FIG. 11 is a block diagram of a specific embodiment of the present invention;

FIGS. 12(*a*), (*b*), (*c*) and (*d*) are curves illustrating the operation of FIG. 13;

FIG. 15 is a table delineating the operation of FIG. 13 for providing first and second bits therein;

FIG. 16 is a table illustrating the operation of a component in FIG. 13;

FIG. 17 is a table showing another example of a nonlinear companding characteristic;

FIG. 18 is a circuit of a component used in FIG. 13; and

FIG. 19 is a block diagram of a decoder embodying the present invention.

DETAILED DESCRIPTIONS

Figure 1:
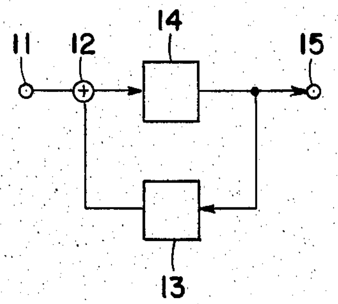
FIG. 1 is a block diagram of one conventional nonlinear encoder.

FIG. 1 shows a block diagram of a sequential feedback digital companding segment type encoder. An analog signal applied to an input terminal 11 is added to an output of a local decoder 13 in an adder 12. Then, the summed signal is sent to a comparator 14 whereby the polarity of the summed signal is descriminated and the output code is delivered to an output terminal 15. When the polarity of the summed signal is positive, the comparator output is "1", and when it is negative, the output is "0". This output signal is fed back to the local decoder and is thereby subjected to logic conversion, to drive the weighting circuit and thus to change the decoder output sequentially for code decision in the order of weight of bit. In this manner, the analog signal is encoded. The encoder as shown in FIG. 1 will be explained more concretely by referring to FIG. 2 wherein, for simplicity, 4-bit encoder is shown. Instead of 4-bit coder, a practical 7-bit or 8-bit encoder may be composed in the same manner. The adder 12 consists of an operational amplifier 121, resistors 122 and 123. This operational amplifier 121 is a DC amplifier with high gain and large bandwidth. The comparison circuit 14 consists of a comparator 141 and a D-type flip-flop 142. The comparator 141 has two input terminals, and its logic output is of either "1" or "0", depending on the polarity of the voltage across said input terminals. At the front edge of the pulse applied to a trigger input terminal 143, the flip-flop 142 memorizes the logic signal given to the data input terminal. The local decoder 13 consists of a memory circuit 131, a matrix circuit 132, a ladder drive circuit 133 and a ladder network 134. The memory circuit 131 comprises RS-type flip-flops 1311 through 1314, OR-gates 1317, 1319, AND-gates 1315, 1316 and 1318 which are to control these flip-flops. The matrix circuit 132 consists of OR-gates 1321 through 1325, AND-gates 13211 through 13213, 13221 through 13223, 13231 through 13234, 13241 through 13245, 13251 and 13252. The ladder drive circuit 133 consists of current generators 1331 through 1336. The ladder network 134 consists of resistors 13401 through 13413. Although the matrix circuit is not included in the local decoder of the feedback type linear encoder, this matrix circuit 132 provides nonlinearity in the feedback type nonlinear encoder. Since the number of coded bits are 4, there are 15 (namely, $2^4-1=15$) quantizing decision levels. Accordingly, the local decoder 13 must deliver a 15 level output. The memory circuit 131 controls the output level of the local decoder 13. There are 16 stages available from "0000" to "1111", by combination of output signals of four flip-flops 1311 through 1314. Among these states, "0000" is not used. In other words, 15 states are used to produce 15 levels of outputs from the local decoder. FIG. 5 shows the relationship among the output of the memory circuit 131 (namely, the input to the matrix circuit 132), the output of the matrix circuit 132 (namely, the input to the ladder drive circuit 133), and the output signal of local decoder 13. In the feedback type encoder, the code decision is made in the order of the weight value of the code bit. First, the local decoder 13 generates the first bit decision level for the purpose of code decision on the first bit. This decision level is an output from the local decoder 13 delivered when the output of the memory circuit 131 is "1000"(seen from Q-side). Similarly, the decision level of the second bit corresponds to "0100" or "1100". Thus, by feeding back the decision result of the first bit to the memory circuit 131, it is decided whether the flip-flop 1311 corresponding to the first bit is reset or not and, at the same time, the flip-flop 1312 corresponding to the second bit is set. Then, the second bit code decision is done, and its result is used for giving the decision level of the third bit. In this manner, code decision is done on the first through fourth bits.

The sequential operation of said encoder will be explained below by referring to the waveform diagram of FIG. 3. The waveforms indicated by the symbols *a* through *t* in FIG. 3 (briefly, 3-*a* through 3-*t*) appear at the points indicated by the corresponding symbols *a* through *t* in FIG. 2. An input PAM signal (3-a) is given to the terminal 11 at time points $t_1$, $t_2$, $t_3$, . .

Figure 3:
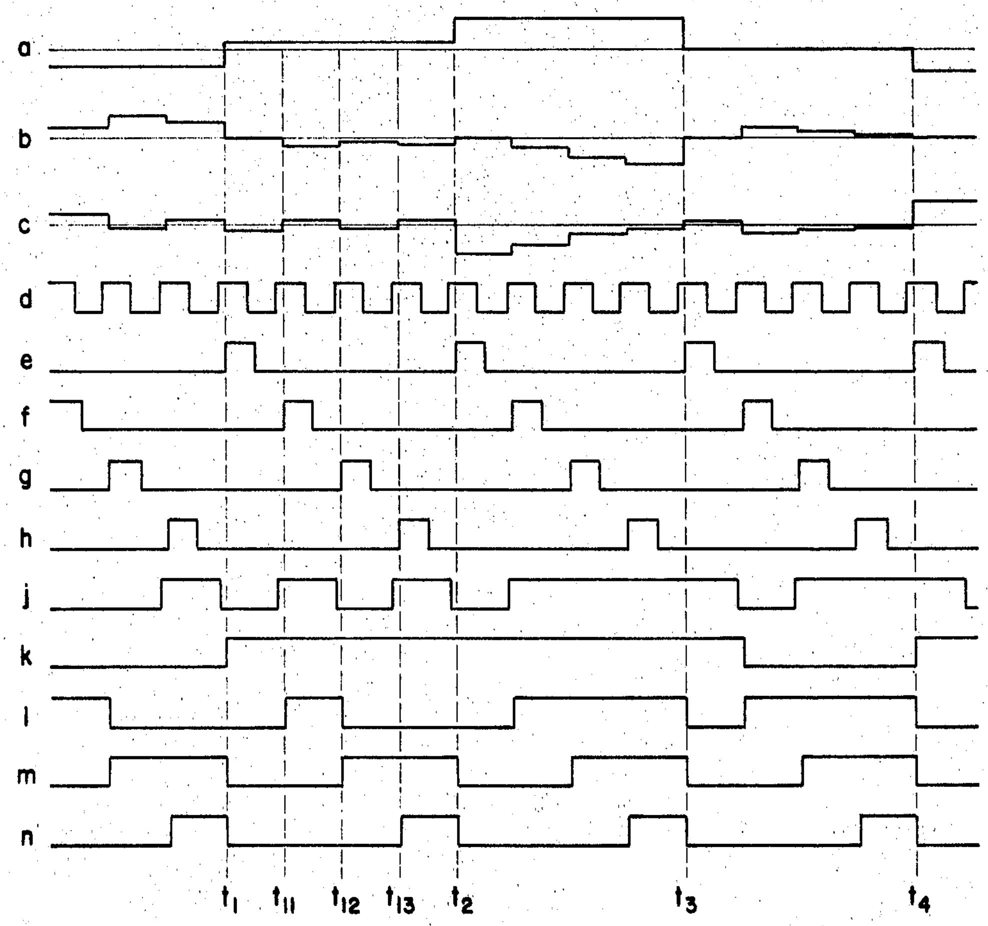
FIG. 3 is a family of waveforms illustrating the operation of FIG. 2.

. . . in FIG. 3. FIG. 4 shows how the PAM signal (3-a) is converted into a PCM signal. For example, an input PAM signal with an amplitude between + 2/30 and + 4/30 is converted into a PCM signal of 1010. It is assumed that an input PAM signal with 3/30 amplitude is given at $t_1$. If so, the flip-flop 1311 is set and those 1312 through 1314 are reset by the pulse (3–*e*) given to the terminal 1351 at said time point $t_1$. As a result, the output of the memory circuit 131 becomes "1000". At this moment, since the input to the current generator 1331 is coupled with the Q-output terminal of flip-flop 1311, this input should stand at "1". The inputs of AND-gate 13211 are "0" and "0", and its output is "0". The inputs of AND-gate 13212 are "0" and "0", and its output is "0". The inputs of AND-gate 13213 are "0" and "0", and its output is "0". Consequently, all the inputs of OR-gate 1321 are "0", and its output is "0". The inputs of AND-gate 13221 are "0", "0" and "1"; therefore, its output is "0". The inputs of AND-gate 13222 are "0", "1" and "0"; therefore, its output is "0". The inputs of AND-gate 13223 are "0", "1 ", and "0"; therefore, its output is "0". Accordingly, the input of OR-gate 1322 are all "0"; hence, its output is "0". The inputs of AND-gate 13231 are "0" and "0"; therefore, its output is "0". The inputs of AND-gate 13232 are "0" and "0"; therefore, its output is "0". The inputs of AND-gate 13233 are "0", "0" and "0", and its output is "0". The inputs of AND-gate 13234 are "1", "0" and "1"; therefore its output is "0". Accordingly, the input of OR-gate 1323 is all "0"; hence its output is "0". Also, the inputs of AND-gate 13241 and "1" and "0"; therefore its output is "0". The inputs of AND-gate 13242 are "0" and "1" ; therefore its output is "0". The inputs of AND-gate 13243 are "0" and "1"; therefore its output is "0". The inputs of AND-gate 13244 are "0" and "0"; therefore its output is "0". The inputs of AND-gate 13245 are "0" and "1"; therefore its output is "0". Accordingly, of the input of OR-gate 1324 are all "0" , and its output is "0". While, the inputs of AND-gate 13251 are "1", "1","1" and "0"; therefore its output is "0". The inputs of AND-gate 13252 are "0", "0" and "0"; and its output is "0". Accordingly, the input of OR-gate 1325 are all "0"; hence, its output is "0". In other words, when the memory circuit 131 is in the state of 1000, the output of matrix circuit 132 is 100000. The outputs of matrix circuit 132 are connected to the inputs of ladder drive circuit 133. When the input of current generator in the ladder drive circuit 133 is "1", a certain constant current flows through output terminal of the current generator. If, however, its input signal is "0", no current flows. The ladder network 134 is a binary code/analog converter. The resistance values of resistors 13401, 13402, 13403, 13404, 13405 and 13406 are determined to be twice those of resistors 13407, 13408, 13409, 13410, 13411 and 13412, respectively. One-third of the output current of current generator 1331 becomes the output current of the ladder network. One-half of one-third, namely, one-sixth of the output current of current generator 1332 becomes the output current of the ladder network. Similarly, 1/12, 1/24, 1/48, 1/96 of the output currents of current generators 1333, 1334, 1335 and 1336 respectively become the output currents of the ladder network. While, because the input of the ladder drive circuit is "100000" after time $t_1$, only the current generator 1331 will be operated. In this state, output current of the local decoder must be zero as illustrated in FIG. 5. For this purpose, a current is supplied thereinto through resistor 13413, so as to cancel the current flowing from the ladder network. As a result, the output current (3-*b*) of local decoder 13 becomes to zero after time point $t_1$, and a current proportional to the input PAM signal (normalized input: 3/36) will flow in the operational amplifier 121. Thus, the output voltage (3-*c*) of adder 12 becomes negative, and the output of comparator 141 becomes "1". This output signal is written in the flip-flop 142 by the trigger pulse (3-*d*) given to the terminal 143, and thus the output Q (3-*j*) of flip-flop 142 becomes "1" and $\overline{Q}$ becomes "0". The $\overline{Q}$ output is fed back to the local decoder, and applied to the AND-gates 1315, 1316 and 1318. The pulse (3-*f*) given to the terminal 1354 at time point $t_{11}$ and said feedback signal are both applied to the AND-gate 1315. Since the feedback signal is "0", the output of AND-gate 1315 is "0", and therefore the flip-flop 1311 is not reset. Said pulse (3-*f*) is given also to the set input terminal of flip-flop 1312, thereby the flip-flop 1312 is set. In this state, therefore, the state of memory circuit 131 becomes "1100" at time point $t_{11}$. The output of the memory circuit 131 is given to the matrix circuit 132. As shown in FIG. 5, the matrix circuit 132 is arranged so that the output of this matrix circuit will become "100110". The output signal of matrix circuit 132 is supplied to the ladder circuit 133, and the resultant output drives the ladder network. Then, the output of the ladder network becomes –6/30 (when the maximum amplitude of the input signal is normalized to 1). While, since the PAM signal is +3/30, the output of the adder 12 is positive, and therefore the output $\overline{Q}$ of the flip-flop 142 is "0", and Q is "1". The $\overline{Q}$ output is fed back to the local decoder 13, and applied to the AND-gates 1315, 1316 and 1318. The pulse (3-*g*) given to the terminal 1353 at $t_{12}$ is applied to the AND-gate 1316. At this moment, the output of AND-gate 1316 becomes "1" and serves to reset the flip-flop 1312 via OR-gate 1317. At the same time, said pulse (3-*g*) is given to the set input terminal of flip-flop 1313, thereby the flip-flop 1313 is set. As a result, the state of the memory circuit becomes "1010", and the output of the matrix circuit becomes "100010". Therefore, the output of the local decoder becomes –2/30, which corresponds to the decision level of the third bit. Since the PAM input is +3/30, the output of the adder 12 is negative, and the information to be written in the flip-flop 142 by the trigger pulse (3-*d*) becomes "1". Consequently, -Q̄- is "1", and $\overline{Q}$ is "0". The Q signal is fed back to the local decoder. This feedback signal is written therein by the pulse (3-*h*) which is supplied to the AND-gate 1318 via terminal 1352 at time point $t_{13}$. However, the feedback signal is "0" and therefore said flip-flop 1313 is not reset. Concurrently, the pulse (3-*h*) sets the flip-flop 1314. As a result, the state of memory circuit 131 becomes "1011", and the output of the matrix circuit becomes "100100". Since the output of the local decoder is –4/30, and the PAM input is +3/30, the information to be written therein by the trigger pulse (3-*d*) is "0". In the foregoing manner, encoding of the first to fourth bits is carried out. As described above, the Q output (3-*j*) of flip-flop 142 turns sequentially to become "1010", which is, in other words, the PCM output signal. In FIG. 3, *k, l, m* and *n* denote the waveforms of Q output of individual flip-flops of memory circuit 131. As explained, the state of memory circuit 131 is "1000" at $t_1$, "1100" at $t_{11}$, "1010" at $t_{12}$, and "1011" at $t_{13}$.

One of the generally employed companding characteristics among various nonlinear companding characteristics is the logarithmic companding characteristic which is called "A-characteristic." This A-characteristic is expressed by the following equations:

$$y=\frac{Ax}{1+\log A} \qquad -\frac{1}{A}\leq x\leq\frac{1}{A}$$

$$y=\frac{1+\log Ax}{1+\log A} \qquad \frac{1}{A}\leq x\leq 1$$

$$y=\frac{1+\log(-Ax)}{1+\log A} \qquad -1\leq x\leq\frac{1}{A}$$

where, *x* represents input; and *y*, output.

The case of A = 87.6 and 7 bits 13 segments approximation of above equation is known as the most general example of the nonlinear characteristics obtained. The input/output characteristics of this case are as shown in FIG. 6 wherein the minimum quantizing step is 1/2048 with respect to the full input dynamic range and, number of bits of a linear local decoder for encoding based on digital companding must be 11 bits. Practically, however, it is very difficult to realize such high precision decoder operated stably and manufactured at a low cost. The current summing type weighting network for realizing a decoder with a large number of bits such as those explained above is very little practicable in the hardware due to the fact that the ratio of resistance values in the weighting network is inevitably large. The ladder network as substitution for said weighting network is also hardly realizable because the resistance value must be highly accurate in the ladder network, a greater number of resistors must be used, etc. Furthermore, the comparator for analog-digital conversion must very accurately be operated since the minimum quantizing step is very small, and impracticable for its realization as a hardware.

FIG. 7 shows a nonlinear encoder of the so-called "first bit folding type." According to this nonlinear encoder, first the input analog signal is rectified, and then feedback encoding is completed in the same manner as the encoder shown in FIG. 1. An analog signal applied thereto from the input terminal 11 is rectified by a first bit encoding circuit 26. The rectified signal is applied to the adder 22. In the adder 22, said rectified signal and the output of local decoder are added together. The summed output is sent to the comparator 24, and a digital output is obtained as the output of the comparator by comparison decision on the summed signal. This digital output is fed back sequentially to the local decoder 23 and decided in the order of weight of bit (from more significant to less significant bits). Thus, a coded output comes out at the output terminal 15.

Figure 2:
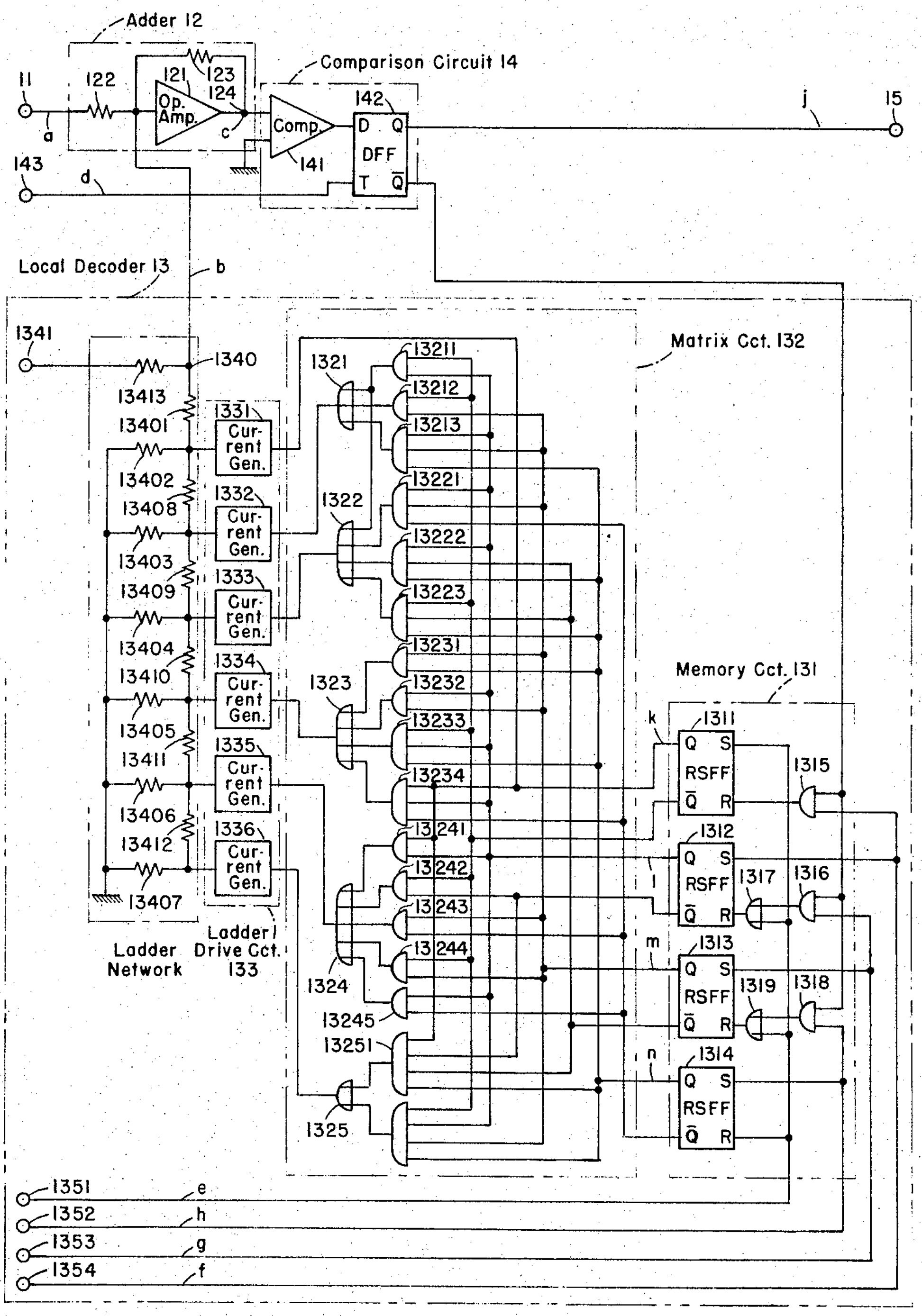
FIG. 2 is a circuit diagram of FIG. 1.
Figure 8:
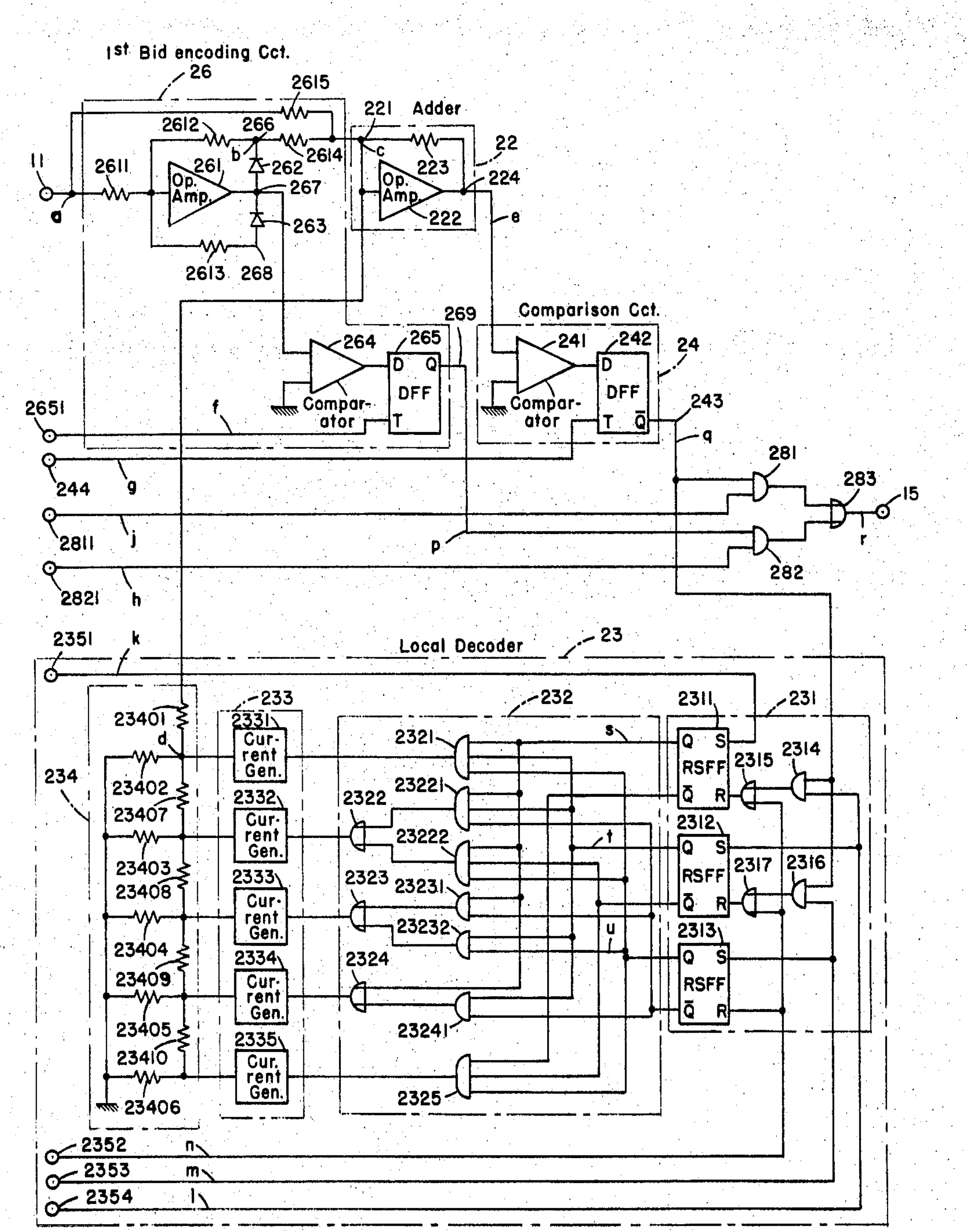
FIG. 8 is a circuit diagram of FIG. 7.
Figure 9:
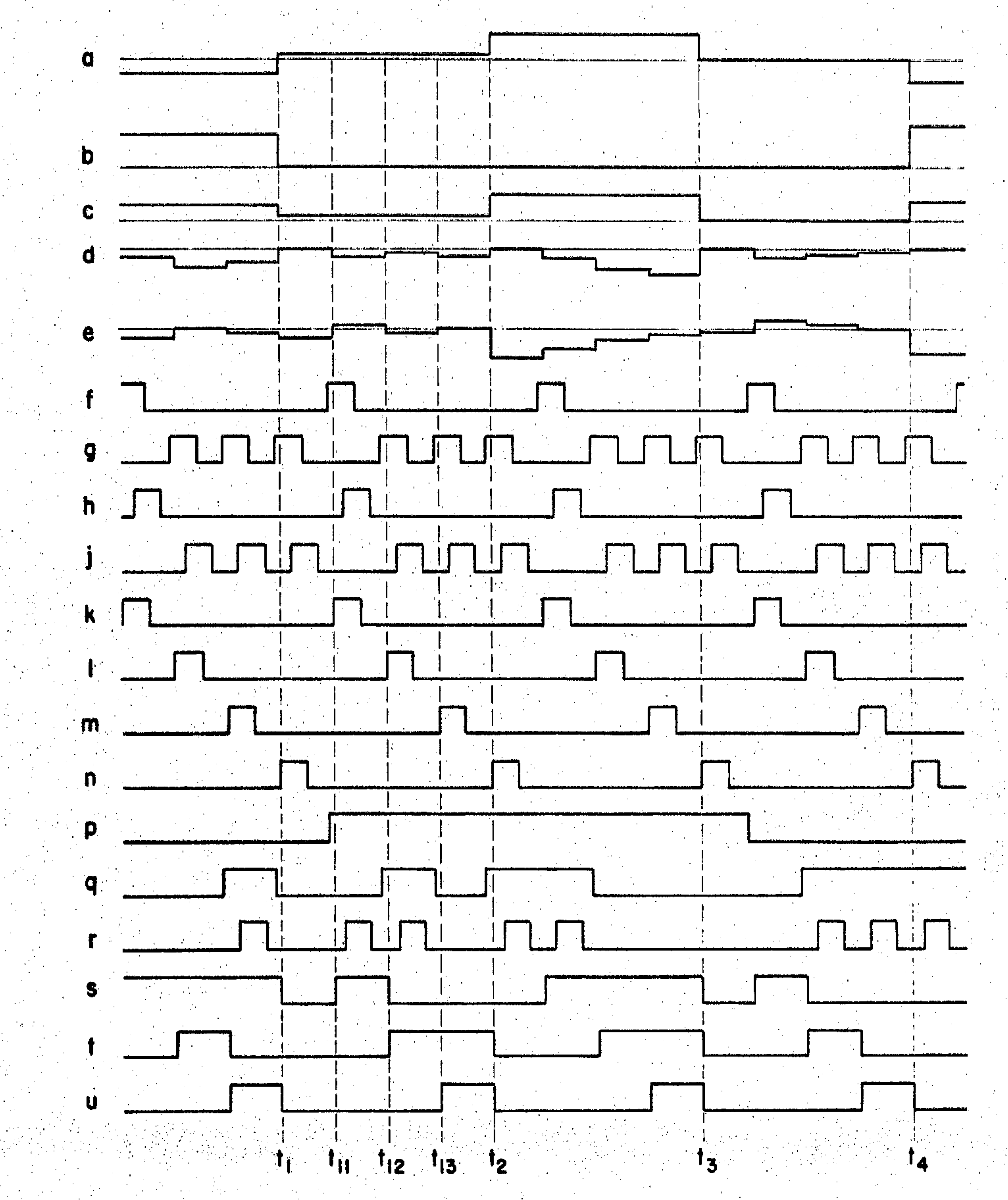
FIG. 9 is a family of waveforms indicating the operation of FIG. 8.

FIG. 8 shows concrete constituents of the first bit folding type encoder. FIG. 4 shows the input/output characteristics of this encoder, which are the same as those of the encoder as shown in FIG. 2. The first bit encoding circuit 26 consists of an operational amplifier 261, diodes 262 and 263, resistors 2611 through 2615, a comparator 264, and a D-type flip-flop 265. When the input signal voltage of the terminal 11 is positive, the voltage at the output point 267 becomes negative. Then, the diode 262 turns off, the diode 263 turns on, and feedback current flows through the resistor 2613. As a result, a negative voltage appears at the output point 268, and the voltage at the output point 266 becomes zero. While, when the input voltage is negative, the voltage at the output point 267 becomes positive, and the diode 262 turns on. Thus, the feedback current flows through the resistor 2612, and the voltage at the output point 266 becomes positive. As a result, the output current of the first bit coding circuit flows through the resistor 2614. When the input voltage is positive, the PAM input current flowing into the adder 22 is only the current flowing through the resistor 2615. When the input voltage is negative, the PAM input current flowing into the adder is represented by the sum of the current flowing through the resistor 2615 and the current flowing through the resistor 2614. In this case, the current through the resistor 2615 is negative, and that through the resistor 2614 is positive. The resistance values of resistors 2611 through 2615 are determined so that the absolute value of the former current may be one half of the latter current. Therefore, the summed current is positive, and its value is equal to the absolute value of the current flowing through the resistor 2615. Namely, the current flowing into the adder 22 is always positive regardless of the polarity of the input voltage. Also, when the absolute value of the input voltage is constant, a constant amount of current should flow into the adder 22. In order to decide the second and the succeeding bits of the PCM output signal in the form of a folded binary code corresponding to the input PAM signal, only the absolute value of the input signal is required. Accordingly, encoding this case can be completed by using said input current. The first bit is decided by the comparator 264 and flip-flop 265. When the input voltage of the terminal 11 is positive, the output of the comparator 264 comes in "1" logic state, and this information is written into the flip-flop 265 by the trigger pulse given to the terminal 2651. Thus the output of flip-flop 265 becomes "1." When the input voltage of the terminal 11 is negative, the output of flip-flop 265 turns into "0". The second bit and the succeeding bits are decided by the feedback type encoding method; the principle of which is the same as that of the encoder shown in FIG. 2. The feedback type encoder circuit consists of an adder 22, a local decoder 23, and a comparator 24. The adder 22 consists of an operational amplifier 222 and a feedback resistor 223. The local decoder 23 consists of a memory circuit 231, a matrix circuit 232, a ladder drive circuit 233, and a ladder network 234. The memory circuit 231 consists of RS flip-flops 2311 through 2313, AND-gates 2314 and 2316, and OR-gates 2315 and 2317. The matrix circuit 232 consists of AND-gates 2321 and 2325, OR-gates 2322 through 2324, and AND-gates 23221, 23222, 23231, 23232 and 23241. The ladder drive circuit 233 consists of current generators 2331 through 2335. The ladder network 234 consists of resistors 23401 through 23410. In order to obtain a time-serial PCM signal, this encoder is provided with a circuit consisting of AND-gates 281 and 282, and OR-gate 283. Since the circuit for deciding the second to fourth bits is three bits feedback type encoder, which has seven quantizing decision levels. Therefore, there are three flip-flops in the memory circuit, and the construction of the ladder network corresponds to five bits. The time chart of this encoder is shown in FIG. 9 (*a* through *u*), wherein these symbols are to indicate the corresponding positions at which the respective waveforms are generated. Since a signal at the input point 221 of the adder 22 is given in the form of current, a current waveform is shown in FIG. 9*c* (briefly, 9-*c* hereinafter). The waveform (9-*a*) indicates an input signal waveform given to the terminal 11. The waveform which appears at the output point 266 of the first bit amplifier is (9-*b*) which appears only when the input voltage (9-*a*) is negative. The waveform (9-*c*) is an input current waveform flowing into the adder 22 by way of resistors 2614 and 2615. This waveform is proportional to the rectified value of (9-*a*). This current waveform is used for deciding the second to fourth bits. The waveform (9-*a*) is the same as that of (3-*a*). The input PAM signal varies at time points $t_1$, $t_2$, . . . . . but remains constant in the individual time interval. The input signal of flip flop 265 is written therein by the trigger pulse (9-*f*) given to the terminal 2651, and the waveform at the output point 269 of flip-flop 265 becomes (9-*p*). This waveform is the first bit output. When the PAM signal voltage + 3/30 is given thereto at time point $t_1$, the flip-flops 2311 through 2313 of the memory circuit 231 are reset by the pulse (9-*n*) given to the terminal 2352. The waveforms at the output points (on Q side) of flip-flops 2311 through 2313 are indicated by (9-*s*) through (9-*u*) respectively. First, in order to decide the second bit, the flip-flop 2311 is set (9-*s*) by the pulse (9-*k*) given to the terminal 2351, and thus the state of memory circuit 231 becomes "100"[(9-*s*) through (9-*u*)]. As illustrated in FIG. 10 showing a characteristic of matrix circuit 232, the output of the matrix circuit is "00110". The output (9-*d*) of the local decoder corresponds to –6/30. Because the summed output of –6/30 and the absolute value of input PAM signal is negative, the voltage (9-*e*) at the output point 224 of adder 22 becomes positive, and the output of the comparator 241 becomes "0". This "0" information is written in the flip-flop 242 by the pulse (9-*g*) given to the terminal 244, and the voltage at the output point 243 (on Q side) of flip-flop 242 becomes "1" (9-*q*). Thus the second bit is decided. Now, the process of deciding the third bit will be explained below. The logical product of the pulse (9-*l*) given to the terminal 2354 and the feedback PCM (9-*q*) is produced by the AND-gate 2314. Since the pulse (9-*l*) is given thereto at time point $t_{12}$ at which (9-*q*) is in "1" state, the flip-flop 2311 is reset. On the other hand, the flip-flop 2312 is set at time point $t_{12}$ by said pulse (9-*l*). In this way, the state of memory circuit 231 becomes "010"[(9-*s*) through (9-*v*)]. As will be understood from FIG. 10, the matrix circuit 232 is arranged so that this matrix circuit output becomes "00010". The output (9-*d*) of the local decoder 23 becomes –2/30, and the summed result of this –2/30 and the absolute value +3/30 of input PAM signal is positive. Accordingly, the voltage (9-*e*) at the output point 224 of adder 22 becomes negative, and the output of comparator 241 becomes "1". This "1" information is written in the flip-flop 242 by the pulse (9-*g*) given to the terminal 244, and thus the output at the point 243 of the flip-flop 242 becomes "0" (9-*q*). The process of the fourth bit decision is the same as that of the third bit. The memory circuit 231 is set to "011" by the pulse (9-*m*) given to the terminal 2353. The output of matrix circuit 232 becomes "00100," and the output of local decoder 23 becomes −4/30. Then, "0" is written in the flip-flop 242. Thus, the whole coding process is completed. In addition, however, a process of obtaining a serial PCM signal is to be executed. Namely, the pulse (9-*h*) given to the terminal 2821 and the first bit output (9-*p*) are applied to the AND-gate 282. Also, the pulse (9-*j*) given to the terminal 2811 and the output (9-*q*) of comparator 24 are applied to the AND-gate 281. Both outputs of AND-gates 281 and 282 are applied to the OR-gate 283 whereby a serial PCM signal is obtained at the output terminal 15 (9-*r*). This is all for the encoding operation. Then, upon receiving another PAM signal, another round of encoding process will start.

In order to realize a nonlinear encoder of A = 87.6, 7-bits, 13-segments approximation by the use of said first bit folding type encoder, it is necessary to provide a linear local decoder of 10-bits equivalent. In this case, in comparison with the arrangement as in FIG. 1, the necessary number of bits is only one bit smaller. However, since the input signal is unipolar, it is sufficient for the local decoder to deliver unipolar outputs. This means that the accuracy required for the local decoder can largely be lowered, because, in the 13-segments companding characteristics, the quantizing step is small when the input signal level is low, and it is large when the input signal level is high, as illustrated in FIG. 6. In the system as shown in FIG. 1, the polarity inversion is done on the bit with the largest weight in the local decoder and, accordingly, the bit with the largest weight is operative even if the input signal level is low. While, in the method as in FIG. 7, the input signal is unipolar, and only a bit with small weight is workable in the local decoder when the input signal level is low. Because the larger weight a bit has, the greater will become the absolute error, the accuracy requirement for the elements used in the local decoder is strictly kept in the system as in FIG. 1. While, in the system as in FIG. 7, the necessary accuracy thereof may be reduced to a great extent. In the method of FIG. 2, for example, the number of bits for the local decoder is 10 and, therefore, it is inevitable that the local decoder becomes somewhat complex in structure. The sensitivity and accuracy required for the comparator used in the system of FIG. 2 must be very high and strictly maintained as in the system of FIG. 1. The system of FIG. 2 tends to be affected especially by the digital noise because its minimum quantizing step is small, and is difficult to be materialized as hardware. Furthermore, since a large number of bits must be used, it becomes necessary to use a ladder network as the weighting network of the local decoder, and to use many high precision resistors. This high precision is attained in general by trimming method including many steps of process for adjustment of the resistance values. The high cost of such high precision resistor makes the realization of an inexpensive encoding system impossible due to a large number of high precision resistors.

It is an object of this invention to provide a simplified and inexpensive nonlinear encoder obviating the foregoing shortcomings unavoidable in the prior art.

The encoder according to this invention is an improved first bit folding type nonlinear encoder in which a second bit amplifier having second bit decision level corresponding to the break point on the segment type amplifying characteristic curve is used whereby the necessary number of high precision resistors is markedly reduced to make the high sensitivity and accuracy of the comparator unnecessary. The rectified analog signal of the input signal of the first bit encoding circuit is nonlinearly amplified by the second bit amplifier. Namely, the input signals below the second bit decision point are expanded, and those beyond it are compressed. The output of the second bit amplifier is converted into codes of the third bit and succeeding bits according to the principle of the feedback type encoder.

FIG. 11 shows a block diagram of the embodiment of this invention. In FIG. 11, an input signal from an analog input terminal 11 is rectified by a first bit encoding circuit 36, wherein at the same time, the first bit is decided.

FIGS. 12(*a*) and 12(*b*) respectively show example of input/output characteristic of the first bit encoding circuit 36, and output waveform in response to a sine-wave input. Now, in FIG. 11, the output of the first bit encoding circuit 36 is applied to a second bit encoding circuit 37 wherein a high gain amplification is applied to an input having the level below the second bit decision level, a low gain amplification is applied to an input having high level, and the second bit is decided. These operations are shown in FIGS. 12(*c*) and 12(*d*) which are the input/output characteristic of the second bit amplifier and the output signal waveform in response to sine-wave input signal respectively. The output of the second bit encoding circuit 37 is applied to an adder 32. The output of a local decoder 33 is also applied to the adder 32. The output of adder 32 is applied to a comparator 34 operating as an analog-digital converter. The output digital signal of the comparator 34 is fed back to the local decoder 33 whereby an encoded output obtained by a so-called feedback type encoder is obtained at an output terminal 15.

Figure 13:
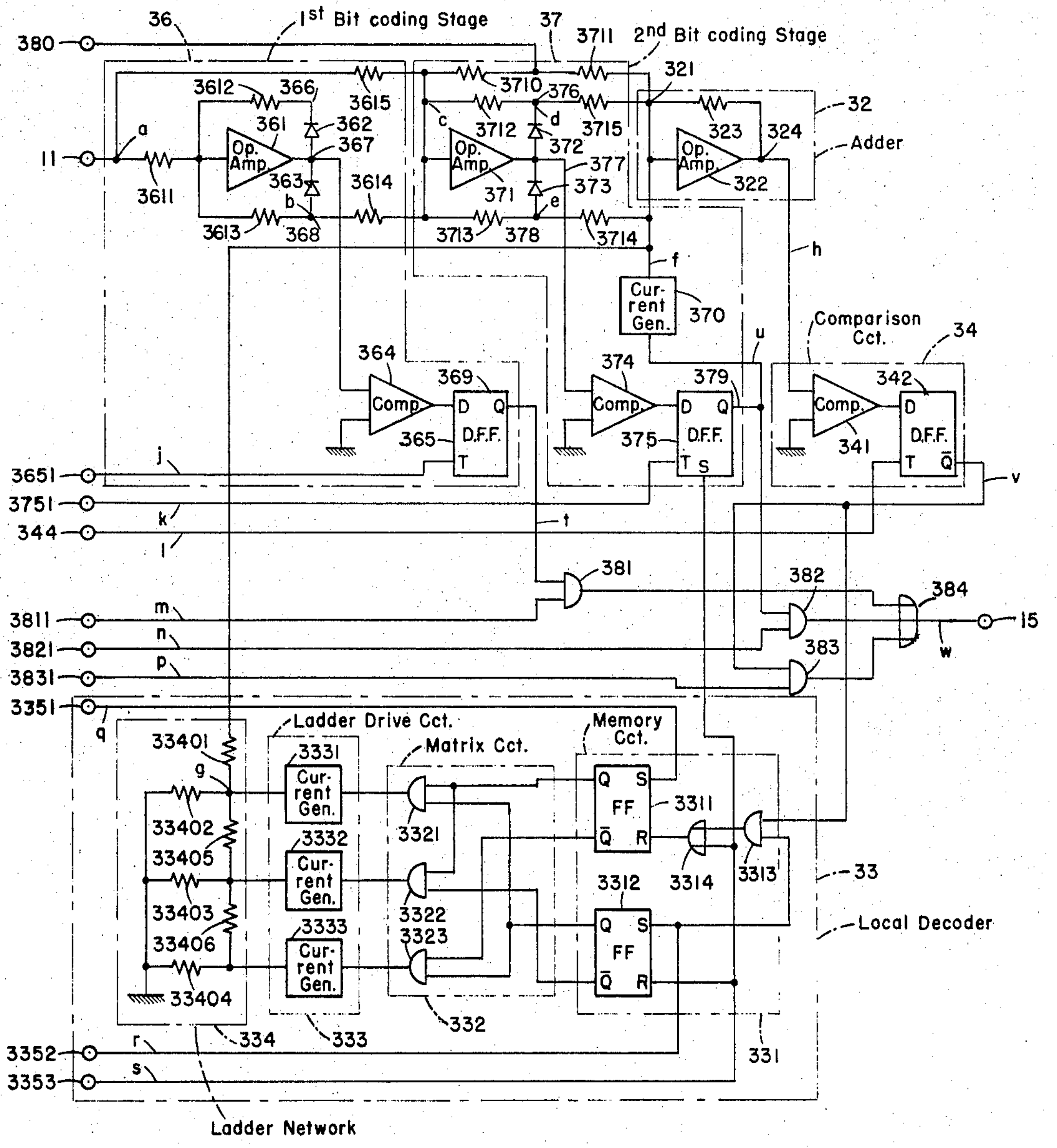
FIG. 13 is a circuit diagram of FIG. 11.

An encoder according to this invention is illustrated concretely in FIG. 13. The input/output characteristic of this encoder is the same as that of the coder shown in FIG. 2 and shown in FIG. 4. Referring to FIG. 13, a first bit encoding circuit 36 consists of an operational amplifier 361, diodes 362 and 363, resistors 3611 through 3615, a comparator 364, and a D-type flip-flop 365. This first bit encoding circuit 36 is operated in the same manner as the first bit encoding circuit 26 of the encoder as in FIG. 8. The output current of the first bit encoding circuit 36, namely, the input current of the second bit encoding circuit 37 is proportional to the rectified value of the input voltage applied to the terminal 11, and is always negative or zero. The operation of the second bit encoding circuit 37 will be explained by referring to FIG. 15. In this example, it is assumed that the input level is +3/30. The second column in FIG. 15 shows the quantizing decision levels. Since the input level +3/30 is between +4/30 and +2/30, the PCM output (the first column) is "1101". The third column shows the output signals of the first bit encoding circuit 36, or the rectified output (either negative or zero) of the signal shown in the second column. The fourth column shows the biased signal obtained by applying a bias of +6/30 to the signals of the third column. From the first and second columns, it is understood that the levels ±6/30 correspond to the second bit decision levels. The bias current corresponding to +6/30 is supplied from a positive power source connected to the terminal 380 through resistor 3710. When the absolute value of the input signal is larger than +6/30, the input of the second bit encoding circuit becomes negative, and the voltage at the output point 377 becomes positive. As a result, the diode 372 turns on, and the diode 373 turns off. The feedback current flows through the resistor 3712 and the output current flows into the adder 32 via resistor 3715. When the absolute value of the input signal is less than +6/30, the diode 373 turns on, the feedback current flows through the resistor 3713, and the output current flows through the resistor 3714. The relationship between the input current of the second bit encoding circuit and its output current is shown in the fourth and fifth columns in FIG. 15. When the absolute value of the input signal is more than +6/30, the voltage at the output point 377 becomes positive, and the output of comparator 374 becomes "0". This "0" information is written in the flip-flop 375 by the trigger pulse supplied to the terminal 3751, and its output becomes "0". While, when the absolute value of the input signal is less than +6/30, the voltage at the output point 377 becomes negative, and the output of flip-flop 375 turns into "1" This output of flip-flop 375 is an output of the second bit. The current generator 370 is driven by the output signal of flip-flop 375. This current generator supplies a current corresponding to −6/30 to the adder 32 when the input signal is "0". A current corresponding to +6/30 is always supplied from the positive power source to the adder 32 by way of the resistor 3711. Therefore, when the second bit is "1", not only the output signal of the second bit encoding circuit but also the current corresponding to +6/30 is applied to the adder 32. The relationship thereof is shown in the fifth and sixth columns in FIG. 15.

From the first and sixth columns, it is understood that there is some relationship between the PCM output and the input of adder 22. Namely, the code of the third and fourth bits become "11" only when the adder input signal is between 0 and 1/30. In the same sense, said PCM output stands at "10", "01" and "00" when said adder input signal of 1/30 to 2/30, 2/30 to 4/30, and 4/30 to 6/30 respectively. In other words, this relationship is utilized in order to obtain the third and fourth bits.

The third and fourth bits are decided according to the feedback type encoding method. The circuit for feedback type encoding consists of an adder 32, a local decoder 33 and a comparison circuit 34. The adder 32 consists of an operational amplifier 322 and a resistor 323. The local decoder 33 consists of a memory circuit 331, a matrix circuit 332, a ladder drive circuit 333 and a ladder network 334. The memory circuit 331 consists of RS flip-flops 3311 and 3312, an AND-gate 3313 and an OR-gate 3314. The matrix circuit 332 consists of AND-gates 3321 through 3323. The ladder drive circuit 333 consists of current generators 3331 through 3333. The ladder network 334 consists of resistors 33401 through 33406. The comparison circuit 34 consists of a comparator 341 and a D-type flip-flop 342.

The operation of this feedback type encoding circuit is the same as that of the corresponding circuit as in FIG. 2 or FIG. 8. As described above, this feedback type encoding circuit operates to convert an input of 0 to 1/30 into "11"; 1/30 to 2/30 into "10"; 2/30 to 4/30 into "01"; and 4/30 to 6/30 into "00". The operation of local decoder 33 is shown in FIG. 16 illustrating the relationship between the input of the matrix circuit, its output and the output of the local decoder.

Figure 14:
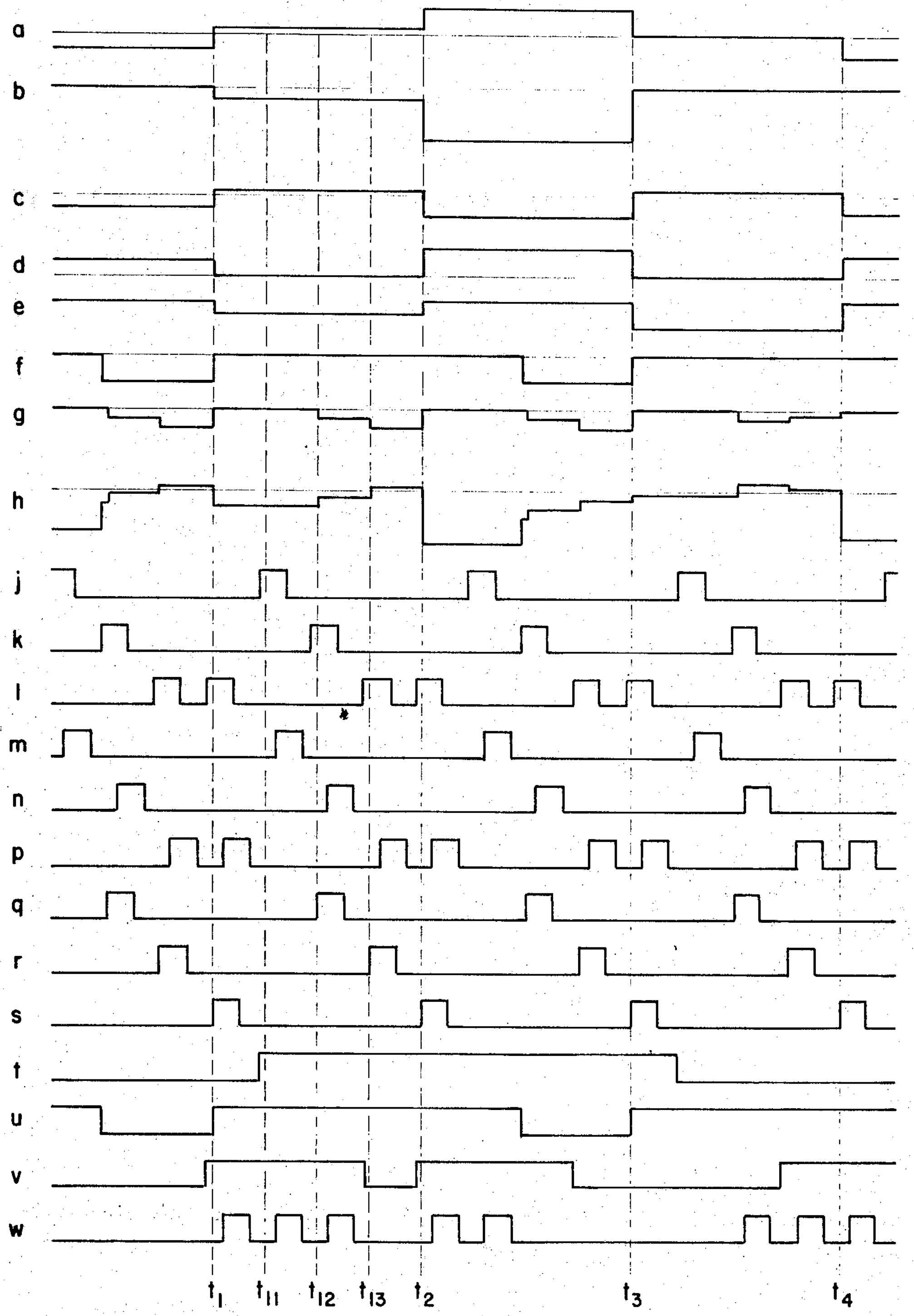
FIG. 14 is a family of waveforms indicating the operation of FIG. 13.

FIG. 14 is a time chart illustrating the operation of this encoder. The waveforms indicated by the symbols *a* through *w* in FIG. 14 (indicated as 14-*a* through 14-*w* hereinafter) are the waveforms at the positions indicated by the corresponding symbols in FIG. 13. An input PAM signal (14-*a*) supplied to the input terminal 11 changes its voltage at time points $t_1$, $t_2$, $t_3$, . . . . . . The waveform (14-*b*) shows a voltage at the output point 368 of the first bit encoding circuit. This voltage is twice as large as the input signal (14-*a*) only when the input signal is positive. The input current of the second bit encoding circuit is the sum of currents flowing therein through the resistors 3614, 3615 and 3710, and is indicated by the waveform (14-*c*). The voltage appearing at the output point 376 of the second bit encoding circuit is positive only when the input current (14-*c*) is negative, and is illustrated by the waveform (14-*d*). The voltage at the output point 378 of the second bit encoding circuit is negative only when the input current (14-*c*) is positive, and illustrated by the waveform (14-*e*). The waveform (14-*f*) denotes a current flowing into the adder 32 from the current generator 370, and shows that this current flows only when the input signal to the adder 32 (namely, the signal (14-*v*) at the output point 379 of D-type flip-flop 375) is "0". The output signal of ladder network 33 is indicated by (14-*g*). For example, in the encoding of input signal applied at time point $t_1$, the third bit decision level provided at $t_{12}$ and the fourth bit decision level produced at $t_{13}$ are applied to the adder 32. The waveform (14-*h*) shows an output voltage of the adder 32. The waveform (14-*j*) shows a trigger pulse for flip-flop 365, which is applied to the terminal 3651. By this pulse, the output signal of comparator 364 is written in the flip-flop 365[(14-*t*)]. Now, (14-*k*) is a trigger pulse of flip-flop 375, which is given to the terminal 3751. By this pulse, the output signal of comparator 374 is written in the flip-flop 375[(14-*u*)]. The waveform (14-*l*) is a trigger pulse for flip-flop 342, which is supplied to the terminal 344. By this pulse, the output signal of comparator 341 is written in the flip-flop 342[(14-*v*)]. The control pulses for the local decoder 33 are the pulse (14-*q*) given to the terminal 3351, the pulse (14-*r*) applied to the terminal 3352 and the pulse (14-*s*) applied to the terminal 3353. By the pulse (14-*s*), the flip-flops 3311 and 3312 are reset at time points $t_1$, $t_2$, . . . . . at which the input PAM signal is changed, and the flip-flop 375 is set. Referring to the input PAM signal at $t_1$, the flip-flop 3311 is set by the pulse (14-*q*) at time point $t_{12}$, and thus the state of memory circuit 331 turns into "10". As a result, as shown in FIG. 16, the output of matrix circuit 332 becomes "010", and the local decoder 33 generates the third bit decision level −2/30. The third bit information (14-*v*), which has been written into the flip-flop 342 by the trigger pulse (14-*l*) immediately before time point $t_{13}$, is fed back to the local decoder 33 and then supplied to the AND-gate 3313. The pulse (14-*r*) is applied to the AND-gate 3313 at $t_{13}$, and this information is written therein. In this case, since the feedback signal (14-*v*) is "0", the flip-flop 3311 is not reset. The flip-flop 3312 is set by the pulse (14-*r*), and thus the memory circuit 331 turns into "11" state. Referring to FIG. 16, the output of matrix circuit 332 is "100", and the output of the local decoder stands at −4/30. This output serves as the decision level of the fourth bit and thus the encoding of the fourth bit is performed.

In addition to the above-mentioned circuits, this encoder is provided with a circuit for delivering a serial PCM signal. As described above, the first and second bits are obtained as the outputs of flip-flops 365, 375, respectively; and the third and fourth bits as the outputs of flip-flop 342. Therefore, it is necessary to provide a circuit for generating a serial PCM signal by coupling said flip-flop outputs. AND-gates 381 through 383 and an OR-gate 384 are operated for this function, wherein the pulses (14-*m*), (14-*n*) and (14-*p*) which are applied to the terminals 3811, 3821 and 3831 respectively are to control said AND-gates and OR-gate. The outputs of the flip-flops 365 and 375 are delivered by the pulses (14-*m*) and (14-*n*) respectively whereby the first and second bits of the serial PCM signal are generated by the AND-gates 381 and 382, and are supplied to the OR-gate 384. The pulse (14-*p*) serves to derive the output of the flip-flop 342 via the AND-gate 383, whereby the third and fourth bits of the serial PCM signal are generated and are supplied to the OR-gate 384. Thus, a serial PCM signal (14-*w*) is obtained at the output terminal of OR-gate 384.

In the 7-bits, 13 segments companding characteristic wherein A = 87.6, the local decoder 33 consists of a linear decoder and a logic conversion circuit of 7-bits equivalent respectively. This 7-bits equivalent local decoder may generally be of that in which the diode compander is employed. For example, the weighting circuit of current summing type may be used for this local decoder. Therefore, this type encoder can be considerably simplified in comparison with said conventional nonlinear encoder (this local decoder would require only seven pieces of said high precision resistor), and the accuracy thereof can be lowered. Also, because a low level analog signal can be amplified by the use of the second bit amplifier, the ratio of the minimum quantizing step to the maximum signal at the input point of the comparator can be made 16 times as great as that obtainable according to the prior art, and therefore the sensitivity and accuracy required for the comparator can be extremely lowered. On the other hand, this encoder needs a second bit encoding circuit. Fortunately, high-performance operational amplifier with IC constitution is available at low cost today. And, it requires only several resistors which are to determine the gain, etc., and the accuracy of the resistors used in the wrighting network may not be so high as required in the prior art.

Only one particular embodiment of the invention has been described above, wherein a 7-bit, 13-segment encoder with a logarithmic companding characteristic (A = 87.6) is explained. Needless to say, the invention is readily applicable to the coder of 8-bits, as well as to the nonlinear encoding system in the case of $\mu$ = 255 and 15-segments nonlinear characteristic which is obtained by segment approximation on the curve expressed by the following equations.

$$y=\frac{\log (1+\mu x)}{\log (1+\mu)} \qquad 0 \leq x \leq 1$$

$$y=\frac{\log (1-\mu x)}{\log (1+\mu)} \qquad -1 \leq x \leq 0$$

where, $x$ denotes an input, and $y$ an output. These companding characteristics (in the case of 7-bits) are shown in FIG. 17.

To realize the encoding system of a logarithmic companding characteristic in the case of 15-segments, 8-bits, and $\mu = 255$, the digital companding by linear encoder as described above may be considered. This system, however, can hardly be realized because of severe accuracy requirement to the weighting resistors. Therefore, a nonlinear folding type encoder having a cascade of nonlinear amplifier circuits being equal in the number to that of bits has been proposed. However, since this nonlinear amplifier circuit is similar to the second bit amplifier circuit of this invention, and such nonlinear amplifier circuits must be provided for each bit, a large amount of power is required for operation. Furthermore, about six pieces of high precision resistors which are to determine the gain must be provided for each stage. While, low power consumption is an inevitable requirement for constructing the apparatus in a small size. Since the circuit of said type must deal with analog value, it is necessary to determine the signal to noise ratio to be more than a certain value. This serves as the limitation on lowering the signal level. As a result, power consumed in the amplifier circuits is large, and it is difficult to miniaturize the apparatus. Also, this system requires a considerable number of amplifier circuits and high precision resistors, and it is impossible to manufacture the encoder at a low cost. Furthermore, because the amplifier circuits are connected in cascade in many stages, very high pulse response must be accomplished in each stage. This function, however, can hardly be materialized. Because of these shortcomings, the conventional 8-bits, 15-segments nonlinear encoder with $\mu = 255$ have not been provided with satisfactory characteristics.

Whereas, according to this invention, the necessary number of amplifier circuits and high precision resistors can be considerably reduced, and these elements may be of such precision as will be available from the well-developed IC technology. This makes it possible to miniaturize the apparatus and to manufacture at a low cost. As for other component parts, such as digital IC circuits and current generators, usual digital IC can be used for the digital IC circuits, and the simple circuit as shown in FIG. 18 can be used for the current generators. In FIG. 18, the reference numeral 401 denotes an input terminal, and 405 is an output terminal. A positive power source is connected to a terminal 402, and a negative power source to 403. A reference power source is connected between terminals 403 and 404. The circuit consisting of diodes 406, 408, 409, 414, and transistors 411, 413, and resistors 407, 412 and 415 is to drive the switching diodes 416 and 417. The circuit consisting of a transistor 418 and a resistor 419 operates as a constant current circuit. When "0" (namely, nearly OV) is applied to the input terminal 401, the collector current of transistor 418 flows through the diode 416, whereby the diode 417 turns off and no current flows in the output. When "1" (for example, +5 V) is applied to the input terminal 401, the collector current of transistor 418 flows to the output terminal 405 by way of diode 417, and the diode 416 turns off. If the collector current of transistor 418 is kept constant, this circuit can be used as a current generator.

In the foregoing embodiment of the invention, only a particular encoder has been described; it is evident that the same principle of the invention can be applied to a decoder. Such decoder can be arranged for use as a complementary circuit to this encoder.

FIG. 19 shows a block diagram illustrating the principal construction of a decoder according to this invention. In FIG. 19, an input signal from a serial PCM input terminal 51 is converted into parallel PCM signals by a serial to parallel converter 52. The third through eighth bit signals are applied to a subdecoder 53 and decoded into an analog signal. The subdecoder 53 is similar to the local decoder 33 in FIG. 13 and consists of a matrix circuit, a ladder drive circuit and a ladder network. The parallel PCM signals are applied to the matrix circuit and expanded in the digital phase. The output signal of the matrix circuit is applied to the ladder drive circuit and it drives the ladder network to generate an analog signal. The output signal of the subdecoder and the second bit PCM signal are applied to the second bit decoding circuit 54. The transfer characteristic of the second bit decoding circuit 54 is complementary to that of the second bit coding circuit 37 in FIG. 13 and the inverse of that of the second bit coding circuit shown in FIG. 12($c$). The output signal of the second bit decoding circuit 54 is a unipolar PAM signal. The unipolar PAM signal and the first bit are applied to a first bit decoding circuit 55. The transfer characteristic of the first bit decoding circuit 55 is the inverse of that of the first bit coding circuit 36 in FIG. 13 shown in FIG. 12($a$). The output signal of the first bit decoding circuit 55 is obtained at a PAM output terminal 56.

We claim:

1. A multi-bit nonlinear apparatus for encoding a pulse analog signal into a preselected number of serial bits, comprising:

a source of a pulse amplitude modulation analog signal varying in negative and positive polarities;

means for translating said analog signal into a first bit and an output signal portion alternately pro-vided with one of a zero magnitude and a predetermined magnitude of negative polarity;

first AND gate means for reading out said first bit from said translating means;

an OR gate for transmitting said first bit from said first AND gate means;

an output terminal for receiving said first bit from said OR gate to constitute a first of said encoded serial bits;

means including a direct current amplifier having an input activated by said translating means output signal portion and an output connected through two different feedback paths to said last-mentioned input for converting said translating means output signal portion into a second bit;

second AND gate means reading out said second bit from said converting means for transmission through said OR gate to said output terminal as a second of said encoded serial bits;

a supply of direct current of predetermined magnitude and positive polarity applied as a biasing current to an input of said converting means to constitute a positive decision level for said second bit;

a generator activated by a "0" second bit received from an output of said converting means for providing an output current having a negative polarity and a magnitude equal to said supply current predetermined magnitude to constitute a negative decision level for said second bit; and sequential feedback means for supplying subsequent serial bits to said encoded serial bits, including:

decoder means activated by a preselected timing signal to provide an output current of decision level for a third bit;

an adder circuit having an input connected to said supply, said amplifier two feedback paths, said generator output and an output of said decoder means for adding output currents of said amplifier two feedback paths and said decoder means to provide an output having one of positive and negative polarities at a given time;

comparator means responsive to said adder circuit output to provide a third bit;

third AND gate means for reading out said third bit from said comparator means for transmission through said OR gate to said output terminal as a third in said encoded serial bits;

logic means responsive to said read-out third bit for further activating said decoder means to provide an output current of decision level for a fourth bit; said adder circuit, said comparator circuit and said third AND gate means responsive in turn to said fourth bit decision level current to transmit a fourth bit through said OR gate to said output terminal as a fourth in said encoded serial bits.

2. The apparatus according to claim 1 in which said decoder means comprises a memory circuit including normally reset first and second flip-flops of which said first flip-flop is set in response to a preselected timing signal while said second flip-flop remains reset for providing "1" and "0" at said first and second flip-flop set outputs, respectively, and thereby "1 0" at an output of said memory circuit to represent said third bit decision level current.

3. The apparatus according to claim 2 in which said decoder means includes an AND gate matrix embodying three AND gates, each having one output and two inputs so connected to set and inversion outputs of said first and second flip-flops as to activate said matrix to provide a "010" output to represent said third bit decision level current.

4. The apparatus according to claim 3 in which said decoder means includes a drive circuit embodying second, third and fourth current generators, each having an input connected to said output of one of said matrix AND gates in said matrix and also having an output; said drive circuit generators selectively actuated in response to said AND gate matrix output "010" to represent said third bit decision level current.

5. The apparatus according to claim 4 in which said decoder means includes a resistor ladder network embodying three parallel resistors and three series resistors so interconnected therebetween and to said outputs of said respective drive generators as to energize said resistors in response to said last-mentioned selectively actuated drive generators to provide said third bit decision level current.

6. The apparatus according to claim 5 in which said decoder means second flip-flop is set in response to a preselected second timing signal while said first-flop is still set for providing "1" and "1" at said first and second flip-flop set outputs, respectively, thereby providing "11" at said memory circuit output to represent said fourth bit decision level current.

7. The apparatus according to claim 6 in which said AND gate matrix further responsive to said memory circuit output "11" changes said last-mentioned matrix from said "010" output to a "100" output to represent said fourth bit decision level current.

8. The apparatus according to claim 7 in which said drive circuit second, third and fourth generators are selectively activated in response to said AND gate matrix output "100" to represent said fourth bit decision level current.

9. The apparatus according to claim 8 in which said resistor ladder network resistors are energized in response to said last-mentioned drive circuit selectively activated generators to provide said fourth bit decision level current.

10. The apparatus according to claim 1 in which said decoder means comprises:

a memory circuit including:

first and second flip-flops which are normally reset; said first flip-flop is thereafter set in response to a first preselected timing signal which said second flip-flop remains reset for providing "1" and "0" at said first and second flip-flop set outputs, respectively, and thereby "10" at an output of memory circuit to represent said third bit decision level current;

an AND gate matrix embodying three AND gates, each having one output and two inputs so interconnected to set and inversion outputs of said first and second flip-flops as to actuate said matrix to provide a "010" output to represent said third bit decision level current;

a drive circuit embodying second, third and fourth current generators, each having an output and an input connected to said output of one of said matrix AND gates; said drive generators selectively activated in response to said AND gate matrix output "010" to represent said third bit decision level current;

a resistor ladder network embodying three parallel resistors and three series resistors so interconnected therebetween and to said respective drive generator outputs as to energize said resistors in response to said lastmentioned selectively activated drive generators to provide said third bit decision level current;

said second flip-flop set in response to a preselected second timing signal while said first flip-flop remains set for providing "1" and "1" at said first and second flip-flop set outputs, respectively, thereby providing "11" at said memory circuit output to represent said fourth bit decision level current;

said AND gate matrix further responsive to said memory circuit output "11" to change said last-mentioned matrix from said "010" output to a "100" output to represent said fourth bit decision level current;

said drive circuit current generators further selectively activated in response to said AND gate matrix output "100" to represent said fourth bit decision level current; and said resistor ladder network resistors are further energized by said last-mentioned drive circuit selectively activated generators to provide said forth bit decision level current.

11. A multi-bit nonlinear apparatus for encoding a pulse analog signal into a preselected number of serial bits, comprising:

a source of a pulse amplitude modulation analog signal varying in negative and positive polarities;

means for translating said analog signal into a first bit and an output signal portion alternately provided with one of a zero magnitude and a predetermined magnitude of one of said negative and positive polarities;

means including a direct current amplifier having an input activated by said translating means output signal portion and an output connected through two different feedback paths to said last-mentioned input for converting said translating means output signal portion into a second bit;

a supply of direct current of predetermined magnitude and the other of said polarities applied as a biasing current to an input of said converting means to constitute a devision level of said other polarity for said second bit;

a generator activated by said second bit received from an output of said converting means for providing an out-put current having said one polarity and a magnitude equal to said supply current of predetermined magnitude to constitute a decision level of said one polarity for said second bit;

sequential feedback means for determining subsequent serial bits including (a) decoder means activated by a preselected timing signal to provide an output current of decision level for a third bit, (b) an adder circuit having an input connected to said supply, said amplifier two feedback paths, said genera-tor output and output of said decoder means for adding output currents of said amplifier two feedback paths and said decoder means to provide an output having one of the positive and negative polarities at a given time, (c) comparator means responsive to said adder circuit output to provide a third bit, and (d) first logic means responsive to said third bit for further activating said decoder means to provide an output current of decision level for a fourth bit, said adder circuit and said comparator circuit responsive in turn to said fourth bit decision level current to determine a fourth bit; and second logic means for combining said first, second, third and fourth bits to obtain said preselected number of serial bits as the output of said apparatus.

* * * * *